Aug. 2, 1966 — L. S. BIALKOWSKI — 3,264,005
FLUID PRESSURE SEALS
Original Filed Feb. 23, 1960 — 2 Sheets-Sheet 1
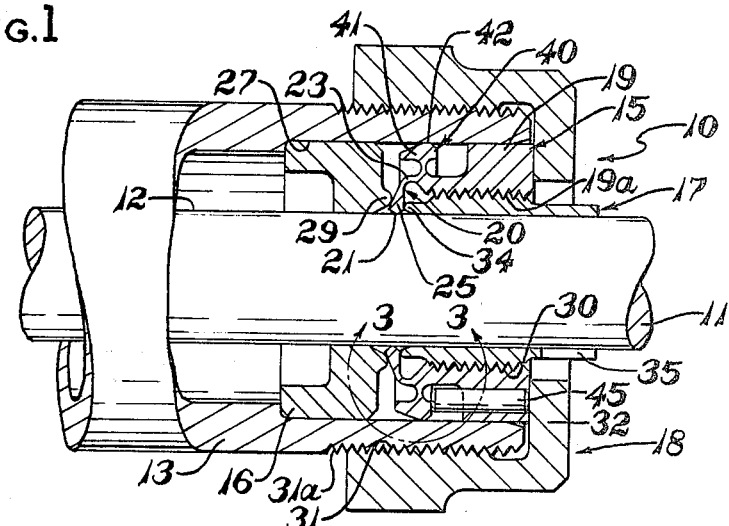
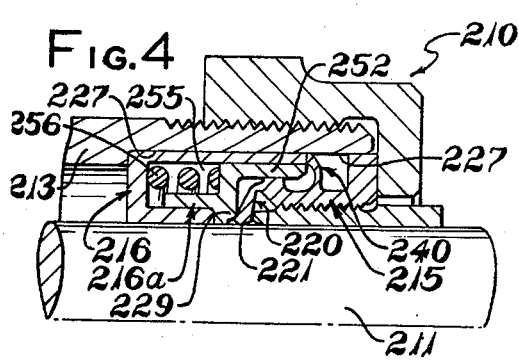
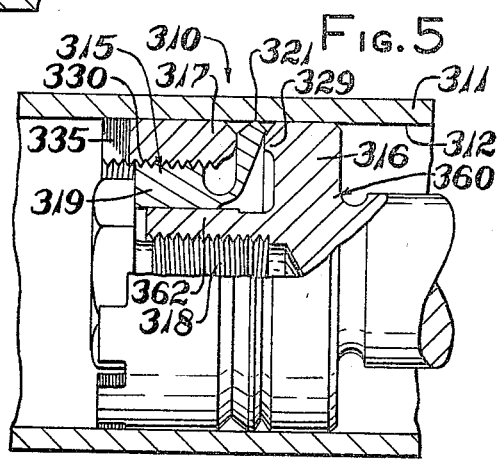
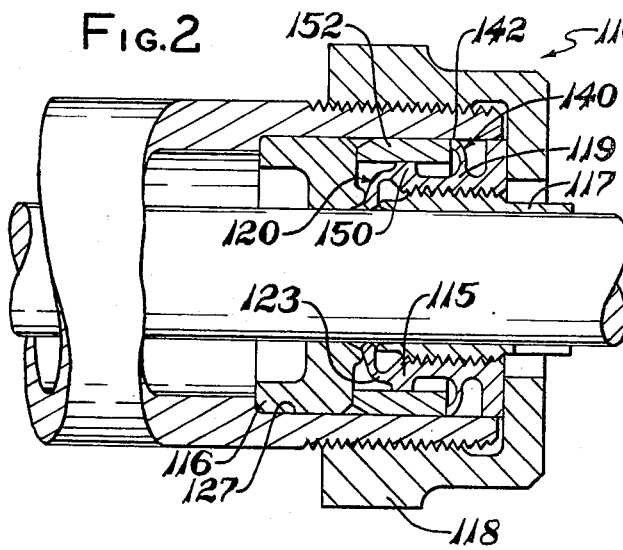
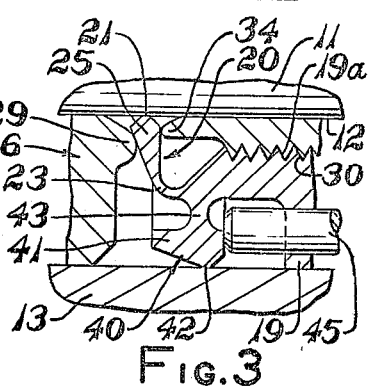
INVENTOR.
LUDWIK S. BIALKOWSKI
BY
ATTY.

Aug. 2, 1966   L. S. BIALKOWSKI   3,264,005
FLUID PRESSURE SEALS
Original Filed Feb. 23, 1960   2 Sheets-Sheet 2

INVENTOR.
LUDWIK S. BIALKOWSKI
BY John D. Haney
ATTY.

United States Patent Office 3,264,005
Patented August 2, 1966

3,264,005
FLUID PRESSURE SEALS
Ludwik S. Bialkowski, Troy, Ohio, assignor to The B. F. Goodrich Company, New York, N.Y., a corporation of New York
Continuation of applications Ser. No. 10,492, Feb. 23, 1960, Ser. No. 223,562, Sept. 13, 1962, and Ser. No. 223,565, Sept. 13, 1962. This application Jan. 11, 1965, Ser. No. 424,678
31 Claims. (Cl. 277—102)

This application is a consolidation of the subject matter disclosed and claimed in my pending U.S. patent application Serial No. 223,562, filed September 13, 1962 (which, in turn, is a continuation of my earlier application, Serial No. 10,492, filed February 23, 1960), and my pending U.S. patent application Serial No. 223,565, filed September 13, 1962, and now abandoned.

This invention relates to fluid pressure seals for hydraulic equipment. The seals of this invention are particularly useful as reciprocating seals and they are especially adapted for use under service conditions where they are subjected to extreme temperature variations. Inasmuch as they are practically insensitive to temperature variations, and they are comparatively small and light, these seals are uniquely suited for aircraft hydraulic systems. They also have utility, however, for general engineering applications and may be used also as rotary and static seals. The invention includes special sealing rings used as elements of these seals, and the resulting assembly of these rings with parts of the equipment with which they are associated.

Fluid pressure seals embodying this invention may be designed which are capable of maintaining substantially perfect sealing integrity against high fluid pressure (e.g. in the order of 4000 pounds per square inch or more) in ambient or operating temperatures ranging from as low as minus 100° Fahrenheit to more than plus 1000° Fahrenheit. Service under conditions such as these is commonly required of aircraft hydraulic systems, and for the most satisfactory mode of operation under these conditions, all the principal elements of the seals of this invention are made of metal. By using a metal for the sealing elements having substantially the same thermal expansion properties as the metal of the parts of the equipment engaged by these elements, the resulting seal assembly has essentially uniform relative dimensions at any given temperature. This feature together with the manner in which the sealing engagement of the sealing elements is effected in accordance with this invention provides for effective sealing integrity under extreme temperature variations.

These seals may be designed for sealing any fluid pressure, their use in this respect being limited only by the size, weight and break-out force of a seal assembly acceptable in a particular environment. For aircraft hydraulic systems in which operating pressures are in the order of 4000 pounds per square inch, for example, seals according to this invention are acceptably small and light and their break-out force is well within acceptable limits. In general, these seals are "self-energizing" in that they become more tightly sealed with increasing pressure. The break-out force of these seals tends to be proportional to pressure, and the break-out force can be partially regulated by the extent to which a seal assembly is initially tightened.

For use in hydraulic systems with ordinary hydraulic fluids, and under the service conditions with widely varying temperatures, the elements of these seals are preferably and most advantageously formed of inexpensive common metals such as carbon steel. No "exotic" materials are needed, although appropriate special high temperature materials could be used if desired for service with temperatures even beyond that suggested in the foregoing, and, if corrosion resistance is desired, stainless steels or other appropriate materials could be used. In any event the seal rings and associated elements of these seals ordinarily may be made by common metal turning operations. The seals do not depend for their satisfactory operation on any critical dimensional features requiring special manufacturing accuracy or selective assembly. Moreover, a seal for dynamic service may be progressively adjusted to compensate for wear. And a seal may be repeatedly assembled and disassembled without damaging the sealing elements.

A seal assembly according to this invention includes an annular metallic sealing ring which fits concentrically with a cylindrical surface of a machine part on which a seal is desired. The sealing ring includes a stiff annular body having a stiff annular sealing diaphragm integral therewith which terminates in a narrow circumferentially continuous sealing edge directed toward the cylindrical surface. In some embodiments of the invention the sealing ring is made so that during assembly its annular sealing edge fits loosely with the adjoining cylindrical surface so that the ring is easy to assemble. Means are provided in the assembly to deflect the annular diaphragm axially relative to the annular body of the ring and thereby urge the sealing edge generally radially into engagement with the cylindrical surface. The sealing edge engages the cylindrical surface with substantially line contact providing extremely high unit sealing pressure.

In another embodiment of the invention, the sealing edge of the diaphragm is made of a diameter such that when the diaphragm is in its free, undeflected state, the sealing edge can not be fitted concentrically with the cylindrical surface. For example, in the case of a seal assembly for encircling a rod, the diameter of the sealing edge will be made smaller than the diameter of the rod. In the case of a cylinder seal, the diameter of the sealing edge will be greater than the diameter of the cylinder. In either case, prior to its assembly, an adjusting sleeve is tightened inside the sleeve body to deflect the diaphragm and thereby change the diameter of the sealing edge to a size which will enable the ring to be assembled so that the sealing edge is presented to the adjoining cylindrical surface. After assembly the adjusting sleeve may be used to adjust the sealing load on the sealing edge. A loading nut of the assembly fastens the entire seal assembly in operating position. This seal assembly provides for very accurate regulation of the sealing load at the interface of the sealing edge and the surface with which it is engaged.

When fully assembled, the sealing edge of the sealing ring normally engages the opposing cylindrical surface with such intensity that the sealing edge tends to indent the cylindrical surface of the engaged part. In view of this effect, and also to maximize dimensional stability of the assembly under varying temperatures, the seals function most effectively where the part engaged by the sealing ring is a material which is somewhat ductile such as the ordinary grades of machine steel commonly used as piston rods, etc. Moreover, the surface of the parts engaged by the ring (in a dynamic seal) is preferably covered by a thin hard wear-resisting surface layer such as may be otained by case hardening the part or by a thin plating of chromium or the like. In a reciprocating seal, the indentation of the sealing ring on such a surface-hardened part is manifested in the form of a slight annular wave or "ripple" in the hard surface layer which moves ahead of the sealing edge as the part is moved axially toward the seal.

Further features of this invention will be explained with reference to the accompanying drawings which show several different preferred seal assemblies as examples of how this invention may be practiced. In the drawings:

FIGS. 1 and 2 are diametrical sectional views of two different seal assemblies each especially adapted for reciprocating service;

FIG. 3 is a fragmentary view of the region of FIG. 1 within the area encircled by the line 3—3, but drawn to a greatly enlarged scale;

FIG. 4 is a partial diametrical sectional view of a seal assembly like FIG. 2 but incorporating certain added modifications;

FIG. 5 is a diametrical sectional view of a seal assembly especially adapted for sealing a piston in a bore;

Figure 6:
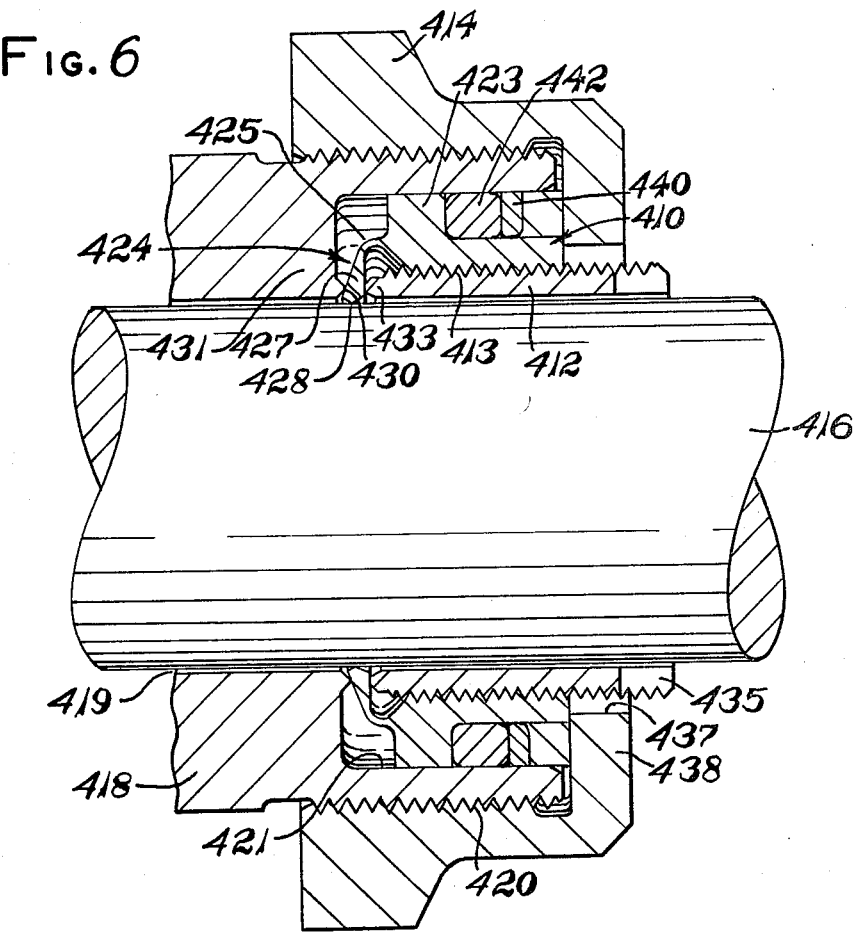
FIG. 6 is a diametrical sectional view of a seal assembly similar to FIG. 1 but incorporating another embodiment of the invention.

A seal 10 in FIG. 1 is shown in sealing engagement with rod 11 along a cylindrical surface region 12 of the rod which projects through the open end of an outer housing 13. Normally fluid under pressure is contained inside housing 13, the seal preventing its escape between rod 11 and the open end of the housing. The elements of this seal 10 include a sealing ring 15, a spacer or "fulcrum" ring 16, an adjusting sleeve 17, and a loading nut 18. All these parts are annular and circumferentially continuous, and when assembled they are nested together coaxially of each other concentrically about rod 11.

The sealing ring 15 has an annular body 19 with a sealing diaphragm 20 at one end turned inwardly toward rod 11. The internal diameter of the body 19 is much larger than rod 11 and is internally threaded at 19a to receive the adjusting sleeve 17 in threaded engagement.

Diaphragm 20 terminates in a narrow circumferentially continuous sealing edge 21 (see also FIG. 3). Edge 21 is preferably shaped in the form of a cylinder several thousandths of an inch (e.g. 0.005 inch) in its axial extent. This edge 21 may be rounded, however, or it may be quite sharp, all these forms being included under the general term "knife edge" sometimes used in this description with reference to sealing edge 21 in that they are adapted to make a substantially line contact with the rod 11 when the seal assembly is complete.

The sealing diaphragm 20 is of generally shallow conical shape in the sense that its sealing edge 21 is both radially and axially offset from an annular zone 23 of the diaphragm where the diaphragm is joined to the body 19 of the sealing ring. The diaphragm is "shallow" in the sense that the radial extent of the diaphragm from its junction at zone 23 to its sealing edge 21 (relative to the axis of the assembly) appreciably exceeds the extent to which edge 21 and zone 23 are axially separated from each other.

Adjacent to its sealing edge 21, the sealing diaphragm 20 is of maximum thickness and becomes progressively thinner toward the zone 23 at its junction with the body. The thick annular marginal region 25 adjoining edge 21 advantageously provides hoop strength for reinforcing edge 21 when the diaphragm is deflected axially of body 19 as hereinafter described. Also the thick annular margin 25 serves as a "heat sink" in that it serves to conduct heat away from the thin edge 21 rapidly, thereby cooling the edge 21. This heat transfer effect is particularly useful in dynamic seals. The thin zone 23 of the diaphragm provides for resilient deflection of the diaphragm axially of body 19.

In assembling the seal 10, the spacer ring 16 is first slipped over rod 11 and seated snugly in a counterbore 27 inside the open end of housing 13. The spacer ring 16 is preferably formed so that its outside and inside diameters slide freely in counterbore 27 and along rod 11, respectively, when making the assembly. Spacer ring 16 includes an annular boss 29 with a smoothly curved ridge directed toward the open end of housing 13. As shown in FIG. 3, the ridge of boss 29 is spaced radially away from the cylindrical surface of rod 11 so that it is adapted to abut the thick annular marginal region 25 of diaphragm 20 when the sealing ring 15 is in turn slipped over rod 11 and into the counterbore 27 in front of spacer ring 16. Although in this assembly spacer ring 16 is a separate piece, it could be made integral with housing 13.

Ring 15 is formed preferably so that its outer diameter fits snugly but slidably inside counterbore 27 and so that its sealing edge 21 slides loosely along rod 11. The ring 15 is slipped over rod 11 and into position with diaphragm 20 abutting the ridge of boss 29, after ring 16 is properly positioned.

The adjusting sleeve 17 is a thin rigid cylinder with an external thread 30 engageable with thread 19a inside body 19 of the sealing ring 15. Adjusting sleeve 17 may be and preferably is part-way threaded into the body 19 and assembled around rod 11 concurrently with the installation of the sealing ring. Alternatively, adjusting sleeve 17 may be threaded into the body of the sealing ring 15 after the latter is forced into its sealing position by loading nut 18 as hereinafter explained. In any case, the bore of adjusting sleeve 17 has slidable clearance or more on rod 11, and is axially longer than the sealing ring 15 so that it extends through and beyond the loading nut 18 in the complete assembly.

The loading nut 18 has an internal thread 31 for engaging a corresponding external thread 31a on the end of housing 13 and an open centered head portion 32 which is adapted to radially overlap and bear on the body portion 19 of the sealing ring. As the loading nut is threaded onto its housing thread 31a, its head portion 32 urges the body 19 of the sealing ring axially toward spacer ring 16 and progressively deeper into the counterbore 27.

Owing to the abutting engagement of the ridge of boss 29 with the thick marginal region 25 of diaphragm 20, and the displacement of the body 19 of the sealing ring 15 by locking nut 18, the diaphragm 20 is subjected to axial force in opposite directions at its marginal region 25 and at its thin annular zone 23 at the junction of the diaphragm 20 with body 19. Such axial force tends to flatten the diaphragm 20 (i.e. to reduce its shallowness or axial extent) by deflecting it at its zone 23 axially toward the body so that the flange 20 is more nearly normal to the rod surface 12. Since the marginal region 25 of the diaphragm is constrained by the boss 29 of spacer ring 16, the diaphragm tends to bend only along its thinner zone 23, and its marginal portion 25 is circumferentially constricted until its sealing edge is in constricting engagement around the cylindrical surface of rod 11. Because the ridge of boss 29 on spacer ring 16 is spaced radially from the sealing edge, but is appreciably closer to the sealing edge than to the junction zone 23, the boss 29 also tends to act like a fulcrum about which the flange 20 is deflected and apparently thereby augments the constricting force exerted by the sealing edge against the cylindrical surface of rod 11.

Only a relatively slight axial deflection of diaphragm 20 is needed to provide sealing pressures of great intensity between the knife-like sealing edge 21 on the surface of rod 11. Although FIG. 1 shows the relative positions of the seal elements when the diaphragm 20 is in tight sealing engagement with rod 11, the actual deflection of the diaphragm to bring it into this condition is so small that FIG. 1 also essentially depicts the shape of the sealing ring 15 and its diaphragm 20 before the ring 15 is installed in the assembly.

After the loading nut 18 is fully tightened to deflect diaphragm 20 to the extent desired, then the adjusting sleeve 17 is threaded fully through the thread 19a inside the body 19 of sealing ring 15 until the forward edge 34 of the adjusting sleeve 17 is brought into abutting engagement with the thick marginal region 25 of the diaphragm axially opposite the zone of this margin engaged with boss 29 of spacer ring 16. The forward edge 34 of the adjusting sleeve 17 is rounded similarly to boss 29. For tightening adjusting sleeve 17, the portion of its outer end which extends through head portion 32 of the cap nut 18, may be slotted as at 35 for engagement by a spanner wrench.

The primary function of the adjusting sleeve 17 is to control the deflection of the diaphragm 20, and the break-out force, and to stabilize the diaphragm 20 in its deflected position and prevent it from chattering or vibrating when the rod 11 is reciprocated. The adjusting sleeve also tends to equalize the drag force exerted by the sealing edge 21 on the rod as the rod is moved axially in either direction.

The diaphragm 20 is disposed in the assembly so that it is directed toward the high pressure region inside housing 13. The sealing assembly is self-energizing and tends to seal even more tightly as pressure increases. The tightening of the seal in response to pressure tends to increase the break-out force for rod 11 but the break-out force can be controlled by the adjusting sleeve 17. The break-out force at low pressures can be adjusted by the extent to which nut 18 is initially tightened.

To illustrate the order of magnitude of the break-out force for these assemblies, a seal assembly corresponding to FIG. 1 is made using a steel sealing ring 15 of SAE 1095 steel, with its sealing edge 21 of 0.005 inch in width. The assembly is made on a 1 inch diameter piston rod of SAE 1020 steel, with a 0.003 inch thick chromium plating on the rod surface. At 4000 pounds per square inch hydraulic pressure, a force of about 150 pounds on the end of the piston rod starts the rod moving axially through the seal. At pressures below about 100 pounds per square inch, a force of about 10 pounds is adequate to move the rod through the seal.

To prevent leakage of fluid between the outer periphery of the sealing ring 15 and the counterbore 27, the sealing ring in FIG. 1 is provided with a secondary or static sealing member 40. This member 40 (see FIG. 3) is in the form of a relatively thick hoop 41 having its outer periphery beveled to form a knife sealing edge 42. The hoop portion 41 is attached to the body portion 19 of the sealing ring by a thin radial web 43. The sealing edge 42 is both axially and radially offset (relative to the axis of the assembly) from the junction of web 43 with the body portion 19 of the ring, so that in this respect the static sealing member 40 is conical also in that a line joining a point on the sealing edge 42 with the closest corresponding point at the web junction 43 would generate a conical surface if rotated about the axis of the assembly.

The sealing ring 15 is normally made with the diameter of the outer sealing edge 42 slightly smaller than the diameter of counterbore 27 so that the sealing ring fits slidably inside the counterbore. Through the body portion 19 of the sealing ring there are a series of arcuately spaced pins 45 (see FIG. 1). These pins are arranged so that as the cap nut 18 is tightened, the pins 45 are engaged by the head portion 32 of the cap nut and thrust axially against the hoop 41 to urge the hoop axially forward. In this way hoop 41 is bent slightly about its web 43 and is therefore expanded to urge the sealing edge 41 radially into sealing engagement with the counterbore 27.

The use of a secondary sealing ring such as ring 40 as a static seal in this assembly is an optional feature, and in lieu thereof, an ordinary metal O-ring or other well-known form of static seal or gasket may be used as a static seal in the assembly.

All parts of the seal 10 in FIG. 1, including the housing 13 and the rod 11, are preferably formed of materials having substantially the same coefficient of thermal expansion. This makes the assemblies substantially insensitive to operating temperature variations since at any particular temperature the parts will expand or contract a proportional amount to maintain the same size relative to each other.

Preferably for ordinary hydraulic fluids in aircraft the several parts of the seal assembly are made of carbon steel. A relatively high carbon steel is preferred for the sealing ring 15, i.e. a carbon steel having a carbon content in the range of about 0.60% to 1.30%. A steel such as annealed 1095 makes a ring 15 which is easily machined and which is hard and wear-resistant. The rod 11 is preferably a more ductile carbon steel, for example, a steel having a carbon content of less than about 0.30% such as SAE 1020, since as explained in the foregoing, the sealing edge 21 of the diaphragm 20 of the sealing ring normally tends to indent the rod 11 when the seal is fully tightened. To provide wear-resistance for the rod, the surface of the rod is preferably case hardened and/or chromium plated to form a hardened skin thereon in the order of about 0.005 inch thick, the underlying portions of the rod forming a deformable matrix for the hardened surface layer.

The sealing assembly 110 in FIG. 2 is generally similar to that of FIG. 1 and has the same mode of operation. It differs primarily from the assembly 10 of FIG. 1 in that the body 119 of the sealing ring 115 in FIG. 2 has a somewhat different shape and also it has a different form of static seal 140. In other respects, the sealing assembly in FIG. 2 includes a sealing diaphragm 120, a spacer ring 116, an adjusting sleeve 117 and a loading nut 118 identical in structure and function to the assembly of FIG. 1.

Sealing ring 115 in FIG. 2 has its body 119 considerably thinner in its radial dimension than its counterpart in FIG. 1. Adjacent the junction zone 123 of diaphragm 120, the ring 115 has a cylindrical portion 150 which peripherally engages the bore of an annular restraining ring 152 (which has no counterpart in the FIG. 1 assembly). The restraining ring 152 fits snugly against spacer ring 116 in counterbore 127. It serves to insure that concentricity exists between sealing edge 21 and the bore bearing surface of ring 116 on rod 111, and it prevents the sealing ring 115 from belling or expanding at the region of its junction zone 123 as loading nut 118 is tightened.

For providing a static seal on counterbore 127, an annular resilient radial flange 140 integral with the body 119 projects outward from the body and terminates in a sealing edge 142 which fits into the annular corner between the end face of restraining ring 152 and counterbore 127. As the sealing ring 115 is tightened into sealing engagement by loading nut 118, the sealing flange 140 is resiliently deformed against the end face of the ring 152 causing the sharp outer peripheral edge 142 to be wedged tightly into the annular corner between the counterbore 127 and the end face of ring 152.

The sealing assembly 210 shown in FIG. 4 includes a sealing ring 215 identical to that shown in FIG. 2. The assembly of FIG. 4 differs from that of FIG. 2 in that it includes spacer rings 216 and 216a which nest together concentrically and cooperate to define an annular cavity 255 in which a spring 256 is caged under high compression. The outer ring 216 fits into counterbore 227 of this assembly and extends axially therein so that its end face is engaged by the static sealing flange 240 of the sealing ring 215. The inner ring 216a fits slidably inside ring 216. It includes a boss 229 and also an axial portion 252 corresponding in function to ring 152 in FIG. 2. The inner ring 216a is biased toward the sealing ring 215 by spring 256.

In the FIG. 4 assembly, the spring 256 insures that the sealing edge 221 of diaphragm 220 is maintained in tight sealing engagement with the surface of rod 211 even though pressure inside housing 213 back of the ring 216 may be at a very low value.

FIG. 5 shows a seal assembly 310 in accordance with this invention, for sealing the periphery of a piston 360 against the bore 312 of a cylinder 311. The piston 360 has a hub portion 362 with a thick radial flange portion 316 on which there is an annular boss 329 terminating in a ridge spaced radially inward from the bore of cylinder 311. This radial flange 316 corresponds in function to the spacer ring 116 of FIG. 1.

An annular sealing ring 315 having a cylindrical body 319 fits closely around hub 362 and has a generally shallow conical sealing diaphragm 320 directed toward the bore of cylinder 311. Between the body portion 319 of the ring and cylinder, there is an adjusting sleeve 317 in threaded engagement at 330 with the outer periphery of the body portion 319 of the sealing ring.

The sealing ring 315 is fastened to the piston and tightened into sealing engagement with the bore of cylinder 311 by a bolt 318 which may be threaded into the central hub portion 362 of the piston. Tightening bolt 318 urges the sealing ring 315 axially toward the radial flange 316 and thereby urges the sealing edge 321 of the diaphragm 320 radially outward against the cylinder bore, essentially in the manner described in connection with FIG. 1. The adjusting sleeve 317 is thereafter tightened against the thick annular margin 325 of the flange 320 as in the prior assemblies. The locking ring is slotted at 335 to permit it to be tightened.

Figure 7:
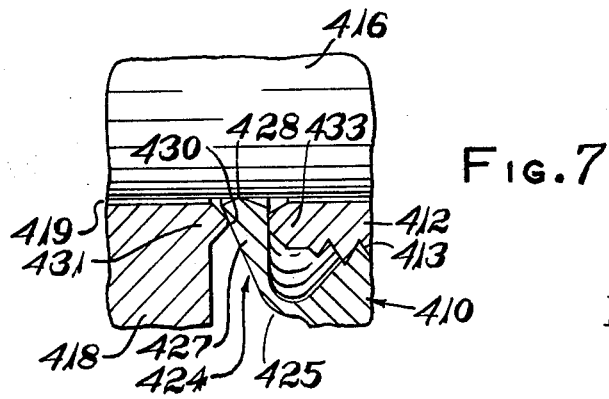
FIG. 7 is a fragmentary view of the seal assembly of FIG. 6.

In the seal assembly shown in FIG. 6 and FIG. 7, the main parts of the seal assembly include a sealing ring 410, a seal-adjusting sleeve 412 which is in threaded engagement at 413 with the seal ring 410, and a loading nut 414. The sealing ring 410 together with adjusting sleeve 412 are concentric with a rod 416 which may be statically mounted, or which may be mounted for reciprocation or rotation relative to a casing 418 containing fluid under pressure such as hydraulic fluid. Ordinarily in a mechanism of this kind the rod 416 will be mounted for reciprocation and it is in reciprocating service that these seals have special utility.

The fluid pressure medium surrounds the leftward regions of the rod 416 inside casing 418 as it is shown in FIG. 6 and communicates with the seal ring 410 through a narrow clearance space 419 between the casing 418 and the rod 416 to exert a rightward force against the seal assembly. The loading nut 414 of the seal assembly is in threaded engagement with the outside end of casing 418 at thread 420 to resist such force.

The sealing ring 410 has a sliding fit inside an annular bore 421 at the mouth of the casing 418. Sealing ring 410 consists of a rigid annular body ring 423 and a sealing diaphragm 424. Diaphragm 424 is joined integrally to the body ring 423 by a slender flexible annular neck 425. The entire diaphragm including the neck region is circumferentially continuous and the diaphragm itself is a solid rigid member except for its annular flexible neck region 425.

The diaphragm 424 is directed inwardly toward the rod 416 and terminates in a thick annular margin 427 on which is formed a sealing edge 428. The sealing edge 428 is preferably in the form of a very narrow annular cylindrical surface, in the order of 0.005 inch in width. Alternatively, the sealing edge 428 may be slightly rounded or it may be quite sharp. The design objective is for the sealing edge to effect a substantially line contact sealing engagement with the rod 416, so that the shape of the sealing edge may vary somewhat within the scope of this criterion. Ordinarily a very narrow cylindrical surface is convenient to manufacture.

The diaphragm 424 is shaped so that the annular sealing edge 428 is offset both radially and axially from the junction of the thin neck portion 425 of the diaphragm with the annular body portion 423 of the sealing ring. Therefore, when the diaphragm is deflected axially relative to the annular body 423 along the flexible zone 425 as hereinafter explained, the diameter of the annular sealing edge 428 is altered appropriately to cause the edge 428 to grip rod 16 tightly.

FIGS. 6 and 7 show the assembly in fully installed operating position, with the sealing edge 428 of the diaphragm tightly engaging the rod 416 to form a fluid tight pressure seal. The diaphragm 424 is held in this assembly tightly jammed against an annular ridge 430 formed on a shoulder portion 431 of casing 418 at the bottom of its bore 421. Ridge 430 engages the thick annular marginal region 427 of the diaphragm radially outward from the sealing edge 428. The opposite side of annular marginal region 427 is in pressure engagement with the blunt forward edge 433 of the adjusting sleeve 412 which is threaded tightly through threads 413 in the body 423 of the sealing ring. The adjusting sleeve 412 has adequate sliding clearance between its internal diameter and the rod 416 to provide for tightening it against the margin. The opposite or outwardly directed end of adjusting sleeve 412 has slots 435 for the reception of a spanner wrench or a similar tool in order to turn the sleeve in its thread relative to body 423. The ring body 423 is forced leftward into bore 421 to maintain engagement of the diaphragm 424 with the annular ridge 430 by the loading nut 414 which is threaded onto the external thread 420 of the casing 418.

Loading nut 414 has a center hole 437 through which the adjusting sleeve 412 projects. A radial region 438 of this nut 414 bears tightly against the body 423 of the sealing ring 410 and also against spacer rings 440 and a metallic O-ring 442 which encircles body 423 of the sealing ring 410. The metal O-ring 442 is deformed by nut 414 and the spacer rings 440 into sealing engagement with the bore 21 and thereby provides a static seal to prevent leakage of fluid between the outer diameter of body 423 and bore 421.

When the assembly is fully installed the main fluid pressure seal is provided by the engagement of the edge 428 with the rod 416. The pressure engagement of marginal region 427 with ridge 430 provides a partial seal but should pressure accumulate in the bottom of bore 421 in the region radially outward from ridge 430, it will be sealed against leakage by the O-ring 442 and spacer ring assembly 440.

The thin slender annular neck region 425 of the diaphragm 424 allows for axial deflection of the diaphragm 424 relative to the body 423, and at least some limited radial deflection of it if the rod 416 should be subjected to non-axial loads. The flexibility of the diaphragm 424 in this respect advantageously protects the sealing edge 428 from being damaged by such loads on the rod.

The sealing edge 428 of the diaphragm 424 may be brought into sealing engagement with the rod 426 as shown in the assembly of FIGS. 6 and 7, by either of two assembly techniques:

According to one assembly technique, the annular sealing edge 428 is made so that in its free undeflected state before the sealing ring is installed, the diameter of the annular sealing edge 428 is slightly larger than the diameter of the rod 416. Accordingly, the diaphragm 424 can be slipped easily over the rod 416. In this method of assembly, preferably the adjusting sleeve 412 is first threaded partially into thread 413 so that its end 433 does not engage the diaphragm 424. After the parts are assembled loosely on rod 416, the sealing ring is loaded by tightening loading nut 414 axially into bore 421 and jams the diaphragm 424 forcibly against ridge 430 on the casing 418. Ridge 430 operates somewhat like an annular fulcrum to deflect the diaphragm axially toward the annular body 423 by bending the diaphragm along its annular flexible zone 425 in response to the force applied by the loading nut 414. As a result of this deflection the sealing edge 428 is radially constricted; that is to say, the edge 428 is reduced in circumference until it is in tight pressure engagement with the rod 416. The loading nut 414 may be tightened on thread 420 as desired to obtain the desired sealing load between sealing edge 428 and rod 416.

It has been found with this form of seal that, in general, the sealing load which is developed between the sealing edge 428 and the rod 416 is a linear function of the "break-out" force of the rod 416 when engaged by the seal. The "break-out" force is the force required to overcome the initial restraining force of the seal on the rod 416. Therefore by tightening nut 414 until a predetermined breakout force exists on rod 416 (which is easily and conveniently measured), the desired sealing load at edge 428 may be obtained with a high degree of accuracy. After loading nut 414 is tightened to the extent desired, the adjusting sleeve 412 is then threaded through its thread 413 to bring its forward edge 433 tightly against the opposite side of the annular margin 427 of the diaphragm, to stabilize the diaphragm and prevent it from chattering as the rod is reciprocated. The break-out force and therefore the unit sealing load on the sealing edge 428 can be modified or adjusted within a fine range by the extent to which the adjusting sleeve 412 is tightened.

A second installation procedure which also leads to very accurate adjustment of the sealing load and the break-out force differs from the first procedure primarily in that the sealing ring 410 is made so that in its neutral or free undeflected state, the diameter of its annular sealing edge 428 is made slightly smaller than the diameter of rod 416.

The first step in this alternate assembly procedure is to thread adjusting sleeve 412 into body 423 of the sealing ring and tighten the sleeve 412 until it axially deflects the diaphragm 424 forwardly, away from body 423 of the sealing ring. This deflection of the diaphragm tends to circumferentially expand the length of sealing edge 428 and therefore increase its diameter. By this means, sleeve 412 is tightened until the diameter of edge 428 will slide easily along rod 416. Then the sealing ring 410 together with the tightened sleeve 412 is assembled around rod 416 and inside bore 421, and loading nut 414 is tightened against the sealing ring to press the marginal region 427 of diaphragm 424 against ridge 430.

At this point in the assembly, the sealing edge 428 will be larger in diameter than rod 416 so that there will be no sealing engagement with the rod 416. However, after nut 414 is initially tightened, the position of sleeve 412 is readjusted by turning it with a wrench in a direction to back the sleeve 412 axially away from diaphragm 424. Owing to the resilience of the diaphragm 424 in its neck region 425, the diaphragm will tend to spring back axially toward body 423 as sleeve 412 is readjusted, and the diameter of the sealing edge 428 will accordingly contract into sealing engagement with rod 416.

By this method of assembly the unit sealing load at the sealing edge 428 can be very accurately controlled by adjusting the position of sleeve 412. It will be ordinarily convenient to determine the sealing load imposed on rod 416 by measuring the break-out force of rod 416.

When sleeve 412 is unscrewed to the point that the desired sealing load/break-out force is obtained, then load nut 414 can be retightened if necessary to lock the seal assembly so that it thereafter continues to operate according to the preset sealing load.

Various embodiments of the seal assembly and the method of installation may be made within the scope of the appended claims.

What is claimed is:

1. A seal assembly comprising:
    (A) two machine parts, one of which presents a cylindrical surface to the other,
    (B) an annular rigid sealing ring concentric with said surface and having
        (1) a stiff annular body, and
        (2) a stiff annular diaphragm integral with the body which
            (a) is resiliently deflectable axially of the body, and
            (b) has an annular margin on which there is a circumferentially continuous sealing edge;
    (C) a sleeve engaged with the body of said ring for adjustment axially of the body toward a position in which one end of said sleeve is engageable with said diaphragm to regulate the extent of the diaphragm's deflection axially of the body and therefore the sealing contact of said sealing edge with said cylindrical surface of said machine part, and
    (D) means for engaging the body of said sealing ring to the other of said machine parts.

2. A seal assembly comprising radially spaced inner and outer concentric machine parts one of which presents a cylindrical surface to the other, an annular rigid sealing ring between said parts, said ring having a stiff annular body and a stiff annular diaphragm integral therewith which is circumferentially continuous and which is joined to the annular body along an annular resiliently deflectable zone of the diaphragm and which terminates in an annular margin on which there is a circumferentially continuous sealing edge; an adjusting sleeve engaged with said body for axial adjustment relative to the body toward a position in which said sleeve engages said diaphragm to regulate the extent of the deflection of said diaphragm axially of the body, and therefore the sealing contact with said cylindrical surface of said machine part, and a loading nut for maintaining said sealing ring in engagement with the other of said machine parts.

3. A seal assembly comprising two machine parts, one of which presents a cylindrical surface to the other; an annular rigid sealing ring concentric with said surface and having a stiff annular body, and a stiff annular diaphragm integral with the body which is circumferentially continuous and which is resiliently deflectable axially of the body, and which has an annular margin on which there is a circumferentially continuous sealing edge presented to said cylindrical surface; said annular sealing edge having a circumference different from the circumference of said cylindrical surface when said diaphragm is in its free undeflected state, the difference being such that the sealing edge in such state can not be assembled concentrically with said cylindrical surface; a sleeve engaged with said body of said ring for axially deflecting said diaphragm relative to said body to change the circumference of said sealing edge to a size sufficient for said sealing edge to engage said cylindrical surface; and means for maintaining said sealing ring in engagement with the other of said machine parts.

4. A seal assembly comprising radially spaced inner and outer concentric machine parts one of which presents a cylindrical surface to the other, an annular rigid metal sealing ring between said parts, said ring having a stiff annular body and a stiff annular diaphragm integral therewith which is circumferentially continuous and which is joined to the annular body along an annular resiliently deflectable zone of the diaphragm and which has a circumferentially continuous sealing edge; an adjusting sleeve in threaded engagement with said body for deflecting said diaphragm axially of said body to change the circumference of said sealing edge sufficiently to engage said cylindrical surface; and a loading nut for maintaining said sealing ring in engagement with the other of said machine parts.

5. A seal assembly according to claim 4 and further comprising means for maintaining sealing engagement between said annular body of the sealing ring, and said loading nut, and said part engaged by the loading nut.

6. A seal assembly for a part having a cylindrical surface, said assembly comprising an annular rigid sealing ring having a stiff annular body and a stiff annular diaphragm integral with the body which has a circumferentially continuous sealing edge, said diaphragm being joined to said annular body along an annular resiliently deflectable zone of said diaphragm; said annular sealing edge having a diameter differing from the diameter of said cylindrical surface when said diaphragm is in its free undeflected state to the extent that in such state the sealing edge can not be assembled concentrically with said cylindrical surface; and an adjusting sleeve engaged with said annular body for axially deflecting said diaphragm relative to said annular body along said annular zone thereof to change the diameter of said sealing edge sufficiently to bring it into pressure sealing engagement with said cylindrical surface.

7. A seal assembly according to claim 6 wherein said sealing ring is adapted for encircling a cylindrical surface on a rod; said sealing edge having a diameter smaller than the diameter of said rod surface when said diaphragm is in its free undeflected condition, and wherein said adjusting sleeve operates to deflect said diaphragm relative to the body to expand the diameter of said sealing edge to effect pressure sealing engagement with said rod surface.

8. A seal assembly according to claim 7 which further comprises a second part surrounding said part having said cylindrical surface, and means for fastening said annular body of said sealing ring to said second part with said sealing edge maintained in said expanded condition.

9. A seal assembly according to claim 6 wherein said sealing edge is of a size to effect substantially line contact sealing engagement with said cylindrical surface.

10. A seal assembly comprising a part having a cylindrical surface, a stiff annular resilient axially deflectable sealing diaphragm which terminates in an annular margin on which there is a circumferentially continuous sealing edge presented to said cylindrical surface, said diaphragm being disposed generally radially of said cylindrical surface, means for maintaining opposing axial force on opposite sides of said annular margin of said diaphragm near said sealing edge, and means for maintaining axial force on an annular zone of said diaphragm spaced radially from said margin, both said means cooperating to maintain said diaphragm in axially deflected condition so that said sealing edge is resiliently deformed into pressure sealing engagement with said cylindrical surface.

11. A seal assembly according to claim 10 wherein said annular margin on which said opposing axial force is applied is appreciably thicker than the remaining regions of said diaphragm, and wherein said sealing edge is shaped to effect substantially line contact with said cylindrical surface.

12. A seal assembly according to claim 10 wherein said sealing edge is axially and radially offset from said annular zone of said diaphragm.

13. A seal assembly comprising a part having a cylindrical surface, an annular rigid sealing ring having a stiff annular body and a stiff annular sealing diaphragm integral therewith which diaphragm terminates in a circumferentially continuous sealing edge presented to said cylindrical surface, said diaphragm being disposed generally radially of said cylindrical surface and being resiliently deflectable axially of said body along an annular zone of the diaphragm which joins it to said body to vary the circumferential length of said sealing edge, and means for maintaining said diaphragm axially deflected relative to said body to resiliently deform said sealing edge into pressure sealing engagement with said cylindrical surface, said means including a sleeve engaged with said body for axial adjustment relative to the body to a position for engaging a side of said diaphragm directed toward said body.

14. A seal assembly according to claim 13 wherein said diaphragm has an annular margin materially thicker than said annular zone joining said diaphragm to said body.

15. A seal assembly according to claim 13 wherein said sealing edge is offset axially and radially from said annular zone relative to said body.

16. A seal assembly according to claim 15 wherein the sealing ring is positioned so that the side of said diaphragm opposite said sleeve is directed toward a fluid pressure source acting on said assembly.

17. A seal assembly comprising a part having a cylindrical surface, an annular metallic sealing ring having a stiff annular body and a stiff annular sealing diaphragm integral therewith which diaphragm terminates in a thick annular margin on which there is a circumferentially continuous knife-like sealing edge presented to said cylindrical surface, said diaphragm being joined to said body along an annular zone thinner than said margin and said diaphragm being axially deflectable relative to said body in said zone to vary the circumferential length of said sealing edge, means for supporting said annular body with said diaphragm disposed generally radially of said cylindrical surface, and means for maintaining said diaphragm axially deflected relative to said body to resiliently deform said sealing edge into pressure sealing engagement with said cylindrical surface, said latter means including a sleeve extending axially along the body and engaged with said body for axial adjustment relative to the body to a position for engaging the side of said annular margin of said diaphragm directed toward the body.

18. A seal assembly comprising a part having a cylindrical surface, an annular rigid sealing ring having a stiff annular body and a stiff annular sealing diaphragm integral therewith which diaphragm is deflectable axially relative to said body and terminates in an annular margin on which there is a circumferentially continuous sealing edge, means for supporting said annular body with said diaphragm disposed generally radially of said cylindrical surface and with said sealing edge presented to said cylindrical surface, means on said supporting means locally engaging said diaphragm at one side of said margin, an adjusting sleeve in threaded engagement with said body and locally engaging the opposite side of said margin, and a loading nut in threaded engagement with said body-supporting means and bearing on said annular body, said means engaging said diaphragm, and said adjusting sleeve, and said loading nut mutually cooperating to regulate the extent to which said diaphragm is axially deflected relative to said body and therefore the sealing engagement of said sealing edge with said cylindrical surface.

19. A seal assembly according to claim 18 wherein said annular margin of said diaphragm is materially thicker than the remaining regions of said body, and wherein said diaphragm is deflectable relative to said body along a thin annular zone of the diaphragm connecting the diaphragm to said body.

20. A seal assembly according to claim 18 wherein said sealing edge is a knife-like edge forming a substantially line-contact sealing engagement with said cylindrical surface.

21. A seal assembly according to claim 18 wherein said annular sealing edge is circumferentially constricted to deform it into sealing engagement with said cylindrical surface.

22. A seal assembly according to claim 18 wherein said annular sealing edge is circumferentially elongated to deform it into sealing engagement with said cylindrical surface.

23. A seal assembly according to claim 18 and further comprising means biasing said local margin-engaging means yieldably against said diaphragm margin.

24. A seal assembly according to claim 18 and further comprising means for statically sealing said annular body and said body supporting means against leakage of fluid around the portion of said body remote from said diaphragm.

25. A seal assembly comprising a part having a cylindrical surface, a stiff annular resilient axially deflectable metallic sealing diaphragm which terminates in an annular margin on which there is a circumferentially continuous sealing edge, said diaphragm being disposed generally radially of said cylindrical surface with said sealing edge presented thereto, means axially abutting opposite local annular regions of said margin of said diaphragm close to said sealing edge thereof, and means for maintaining an axial force on said diaphragm at an annular region thereof radially offset from said margin to resiliently distort the free circumferential length of said sealing edge and thereby maintain said edge in pressure sealing engagement with said cylindrical surface.

26. A sealing ring comprising an annular rigid body having an integral stiff annular sealing diaphragm with a circumferentially continuous sealing edge radially offset from said body, said diaphragm being resiliently deflectable relative to said body without distorting the body to resiliently alter the free circumferential length of said sealing edge so that said edge is capable of providing sealing engagement with an adjoining surface mating with said edge, and a sleeve engaged with the body for adjustment axially along the body toward a position in which one end of the sleeve is engageable with the side of the diaphragm directed toward said body for regulating the axial deflection of said diaphragm.

27. A sealing ring comprising an annular rigid body having an integral stiff annular sealing diaphragm with a circumferentially continuous sealing edge, said diaphragm being resiliently deflectable relative to said body without distorting the body to resiliently alter the free circumferential length of said sealing edge so that said edge is capable of providing sealing engagement with an adjoining surface mating with said edge, and means engaged with the body for axial adjustment along the body to a position of engagement with the side of the diaphragm directed toward the body for engaging and regulating the axial deflection of said diaphragm.

28. An annular metal sealing ring comprising an annular rigid body having an integral stiff annular sealing diaphragm terminating in a circumferentially continuous sealing edge radially offset from said body, said diaphragm being resiliently deflectable relative to said body without distorting the body along an annular zone of said diaphragm joining it to said body to resiliently alter the free circumferential length of said sealing edge and thereby urge said edge into sealing engagement with an adjoining surface mating with said edge, a threaded axial surface on said body, and a sleeve concentric with the body and in threaded engagement with said axial surface and adapted for bearing axially against an annular localized portion of said diaphragm adjoining said sealing edge.

29. A sealing ring according to claim 28 wherein the annular portion of said diaphragm engageable with said sleeve is an annular margin of the ring on which said edge is formed, said margin being materially thicker than said annular deflectable zone of said diaphragm.

30. A sealing ring according to claim 28 wherein said sealing edge is a knife edge for effecting line contact sealing engagement.

31. A metal sealing ring comprising an annular rigid body having an integral stiff annular sealing diaphragm thereon terminating in a circumferentially continuous sealing edge, said sealing edge being radially and axially offset from the junction of the diaphragm with said body and also radially offset from said body, said diaphragm having a thick margin adjoining said edge and being thinner at said junction, and said diaphragm being resiliently deflectable axially relative to said body at said junction to change the circumference of said sealing edge, and a sleeve extending axially through said body and engaged with the body for axial adjustment relative to the body to engage the side of said diaphragm directed toward said body.

References Cited by the Examiner

UNITED STATES PATENTS

| | | | |
|---|---|---|---|
| 1,840,312 | 1/1932 | Dunmire | 277—211 X |
| 2,509,151 | 5/1950 | Kasten | 277—187 X |
| 3,003,795 | 10/1961 | Lyon. | |
| 3,047,300 | 7/1962 | Taylor et al. | 227—102 |

SAMUEL ROTHBERG, *Primary Examiner.*